United States Patent [19]

Happel

[11] 4,119,066
[45] Oct. 10, 1978

[54] INTERNAL COMBUSTION ENGINE
[75] Inventor: Robert Happel, Waiblingen, Germany
[73] Assignee: Daimler-Benz Aktiengesellschaft, Germany
[21] Appl. No.: 696,691
[22] Filed: Jun. 16, 1976
[30] Foreign Application Priority Data
Jun. 20, 1975 [DE]  Fed. Rep. of Germany ....... 2527406
[51] Int. Cl.$^2$ .................... F02B 19/10; F02B 19/16
[52] U.S. Cl. ....................... 123/32 SP; 123/32 ST; 123/139 AW
[58] Field of Search ............. 123/32 ST, 32 SP, 127, 123/139 AW

[56] References Cited
U.S. PATENT DOCUMENTS

| | | | |
|---|---|---|---|
| 2,136,959 | 11/1938 | Winfield | 123/139 AW |
| 2,884,913 | 5/1959 | Heintz | 123/32 SP |
| 3,443,552 | 5/1969 | Von Seggern et al. | 123/32 ST |
| 3,824,965 | 7/1974 | Clawson | 123/32 SP |
| 3,924,598 | 12/1975 | Davis | 123/32 ST |

Primary Examiner—Ronald B. Cox
Attorney, Agent, or Firm—Craig & Antonelli

[57] ABSTRACT

An internal combustion engine operating with applied ignition and with minimum-quantity-injection into an ignition chamber terminating in a main combustion space which is variable in volume, and in which the main combustion space is additionally supplied with fuel; the minimum-quantity injection nozzle coordinated to the ignition chamber is thereby connected in a fuel circulatory system into which is fed a substantially constant fuel quantity exceeding the injection quantity for the minimum-quantity injection nozzle; a throttle cross section is provided in the return of the fuel circulation downstream of the minimum-quantity injection nozzle while the supply of the fuel to the main combustion space takes place by way of a suction-pipe injection system, whereby the suction-pipe injection quantity is branched off from the return of the fuel circulation and is controlled as a function of load by the adjustment of the throttle cross section in dependence on the load.

20 Claims, 1 Drawing Figure

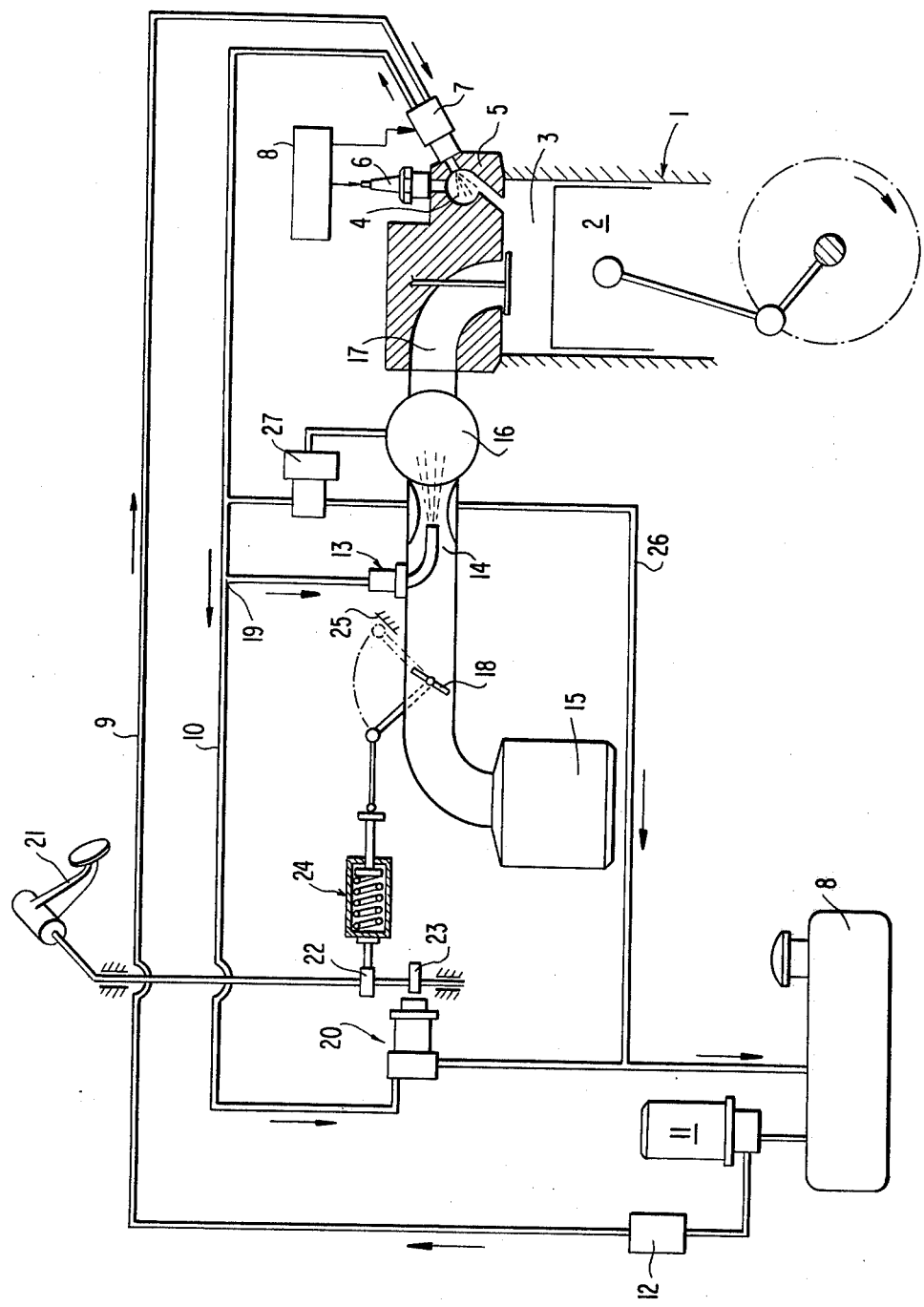

INTERNAL COMBUSTION ENGINE

The present invention relates to a combustion engine which operates with internal combustion, applied or externally controlled ignition and minimum-quantity injection into an ignition chamber terminating in the main combustion space having a variable volume, in which the main combustion space is additionally supplied with fuel and in which the minimum-quantity injection nozzle coordinated to the ignition chamber is interconnected in a fuel circulatory system starting from the fuel tank, which is supplied with a constant fuel quantity exceeding the discharge quantity of the minimum-quantity injection nozzle and in whose return is provided a throttle cross section downstream of the minimum-quantity injection nozzle.

Independently of the described supply of the nozzle injecting into the ignition chamber, by way of which is conducted a larger fuel quantity than required for the injection for purposes of cooling the injection nozzle and for which the required injection pressure is being built up by the provision of a throttle place in the return, a separate fuel supply for the main combustion space is provided heretofore in internal combustion engines of this type. It has already been proposed to so construct the fuel supply for the main combustion space that the air-fuel ratio of the combustion is controlled as a function of the load of the engine at least over a part of the rotational speed range in such a manner that this ratio is reduced with an increasing load, starting from the upper limit of a lower load range in which an approximately constant, large air-fuel ratio exists. In the proposed construction, the supply of the main combustion space thereby takes place by way of a carburetor, to which is coordinated an air by-pass whose cross section is changed in dependence on the position of the throttle valve of the carburetor.

An appropriate construction for an internal combustion engine of the aforementioned type is to be achieved by the present invention which makes it possible to operate such an engine in the sense of the foregoing explanation with quantity control within the lower load range and with quality control within the upper load range. This is achieved according to the present invention in that with the supply of the fuel to the main combustion space by way of suction-pipe injection, the suction-pipe injection-quantity is branched off from the return of the fuel circulation for the ignition chamber injection nozzle and is controlled in dependence on the load by a load-dependent adjustment of the throttle cross section. By means of this construction, the aimed-at operating characteristics can be achieved with simple means in internal combustion engines of the aforementioned type.

It is appropriate in the realization of the present invention if the return-throttle cross section is controlled in dependence on the position of the throttle valve coordinated to the suction-pipe, whereby the return-throttle cross section is preferably controlled by a fuel pressure control valve.

Appropriately, the return-throttle cross section and the throttle valve are actuated by way of the drive pedal of the vehicle.

The reduction of the air-fuel ratio for the upper load range can be achieved within the scope of the solution according to the present invention in a simple manner in that an automatically returning transmission member which is elastic or yielding in an actuating direction corresponding to the opening direction thereof, is arranged in the actuation of the throttle valve. In conjunction with the load-dependent control of the throttle cross section with a view toward an increasing closing of the throttle cross section with increasing load, such a construction has as a consequence that after attaining the full open position of the throttle valve, the return throttle cross section can be narrowed further by way of the drive pedal without further adjustment of the throttle valve and therewith the fuel quantity injected into the suction-pipe can be increased, and more particularly with essentially the same sucked-in air volume so that a change in the quality of the air-fuel ratio fed to the main combustion space in the sense of an increase of the fuel proportion results.

Within the range of the quantity control, i.e., within that range in which one operates with an essentially constant, relatively high air-fuel ratio, a fine control is appropriate within the scope of the present invention, by means of which deviations from the intended value of the air-fuel ratio which occur, for example, conditioned on barometric pressure, can be compensated. The required re-adjustment can be realized within the scope of the present invention by an adaptation of the suction pipe injection quantity whereby this adaptation is attainable in dependence on the suction pipe pressure. A concrete solution in that respect essentially consists in that a by-pass line by-passing the branching-off to the suction-pipe injection nozzle as well as the fuel pressure control valve is coordinated to the return line, in which is arranged a throttle element controlled in dependence on the suction pipe pressure. This throttle element can be controlled in such a manner that, for example, in case of an increased barometric pressure compared to the intended value and with a correspondingly increased air proportion resulting therefrom compared to the intended value, the by-pass line is closed somewhat more by way of the throttle element so that an increased pressure results in the return line and accordingly an increase of the suction-pipe injection quantity.

Accordingly, it is an object of the present invention to provide an internal combustion engine which avoids by simple means the aforementioned shortcomings and drawbacks encountered in the prior art.

A further object of the present invention resides in an internal combustion engine equipped with a main combustion space and with an ignition chamber separately supplied with fuel, in which no separate fuel supply system is required for the supply of fuel to the main combustion space.

A further object of the present invention resides in an internal combustion engine of the type described above in which the engine can be operated with quantity control in the lower load range and with quality control in the upper load range by the use of a simple fuel supply system utilizing relatively few parts.

Still a further object of the present invention resides in an internal combustion engine which attains the aforementioned desirable operating characteristics by extremely simple means.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view of an internal combustion engine with an associated fuel supply system in accordance with the present invention.

Referring now to the single FIGURE of the drawing, the schematically illustrated internal combustion engine constructed as reciprocating piston engine is generally designated in the illustrated embodiment by reference numeral 1, which includes a main combustion space 3 changeable in volume as a result of the movement of the piston 2. An ignition chamber 4 which terminates in the main combustion space 3 is preferably arranged as illustrated in the cylinder head 5 of the engine; a spark plug 6 as well as an injection valve 7 are coordinated to the ignition chamber 4 whereby the injection valve 7 is constructed as conventional solenoid valve not illustrated in detail herein. The ignition instant of the spark plug 6 and the injection periods of the injection valve 7 may be controlled thereby in a conventional manner by way of a control device 8, which is illustrated only schematically, in dependence on the load, i.e., on the throttle valve position, on the rotational speed and/or possibly on the engine temperature of the engine reflected for example by the cooling water temperature.

The injection valve 7, by way of which preferably only a portion of maximum about 4 to 6% of the respective fuel consumption quantity is injected, is arranged in a fuel circulatory system starting from the fuel tank 8, which includes an inlet line 9 and a return line 10, and in which the fuel is supplied out of the tank 8 into the inlet or feed line 9 by way of a pump 11 with constant feed quantity. A filter 12 is connected in the inlet line 9 downstream of the pump 11. The fuel quantity supplied by way of the pump 11 through the inlet or feed line 9 flows in its full amount through the injection valve 7, whereby the non-injected fuel portion serves as cooling medium for the injection valve 7 and is returned by way of the return line 10 toward the fuel tank 8. This fuel proportion conducted to the fuel tank 8 by way of the return line 10 is used within the scope of the present invention for the supply of the main combustion space 3 with fuel.

The supply of the main combustion space 3 thereby takes place by way of a suction-pipe injection system and, for that purpose, fuel is injected by way of the suction-pipe injection nozzle 13 into the suction-pipe 14, through which the fresh air sucked in by way of the air filter 15 is conducted to a mixture manifold 16 and from there by way of valve controlled inlet channels 17 to the respective main combustion space 3. A throttle valve 18 is thereby arranged in the suction-pipe 14 upstream of the suction-pipe injection nozzle 13 which, as also an adjustable throttle cross section arranged in the return 10 downstream of the branching-off place 19 to the suction-pipe injection nozzle 13 and formed by a throttle valve 20, is to be controlled in dependence on the load by way of a load control member or drive pedal 21.

In the schematic illustration shown in the single FIGURE, a mechanical connection from the drive pedal 21 to the throttle valve 18, on the one hand, and to the throttle valve 20, on the other, is provided which includes each an adjusting cam 22 and 23 for the throttle valve 18 and the throttle valve 20, respectively. An automatically returning transmission member 24 which is elastically yielding in the actuating direction corresponding to the opening direction of the throttle valve 18, is thereby provided in the connection from the adjusting cam 22 to the throttle valve 18, which upon abutment of the throttle valve actuation at an abutment 25 corresponding to the fully opened position of the throttle valve 18 enables an adjustment of the drive pedal 21 in the direction toward the so-called full load position independently of the construction of the cam 22 in order to attain above the fully opened position of the throttle valve 18 an additional increase of the fuel supply by way of the suction-pipe injection nozzle 13 by a further throttling of the throttle cross section adjustable by the throttle valve 20. The construction of the over-all system may be made thereby in such a manner that with a full load position predetermined by way of the drive pedal 21, the return 10 is interrupted by the throttle valve 20 at the location thereof so that the fuel quantity supplied by way of the pump 11 into the fuel circulatory system, apart from the small proportion which is injected into the ignition chamber 4 by way of the injection valve 7, is added by way of the suction-pipe injection valve 13 to the fresh gas supplied to the main combustion space 3.

This construction of the fuel supply system has as a consequence that the engine is operated with an essentially constant air-fuel ratio within that load range which is controlled by adjustment of the throttle valve 18, and more particularly with a relatively large air excess (for example, $\lambda \approx 1.8$) so that the engine is operated with quantity control in the lower and in the partial load range of the engine. Above this load range in which one operates with adjustment of the throttle valve, the throttle valve 18 is fully opened and one operates exclusively by adjustment of the throttle cross section adjustable by way of the throttle valve 20. Accordingly, the engine is operated in this uppermost load range up to the full load point with quality control whereby in the full load point preferably an air ratio of $\lambda°1.0$ exists.

A completely satisfactory ignition is thereby assured over the entire operating range of the engine in that as a result of the injection of a fuel quantity matched to the respective operating conditions into the ignition chamber 4, optimum ignition conditions always exist thereat so that starting from the ignition chamber a complete combustion of the respectively existing mixture is assured. This is true in particular also for the load range with quantity control, in which a good ignition and full combustion of the mixture is achieved by the construction according to the present invention by reason of the jet-flame ignition attained by way of the ignition chamber 4 notwithstanding the existing high air ratio of $\lambda \approx 1.8$.

In order to compensate for fluctuations of the atmospheric pressure or density fluctuations caused by other circumstances with a view toward maintaining a constant air ratio in the quantity control range by an adaptation of the fuel quantity supplied by way of the suction-pipe injection nozzle 13, a by-pass line 26 is provided which is connected with the return line 10 upstream of the branching-off place 19 as well as downstream of the throttle valve 20. A further throttle element 27—which preferably operates in the manner of a differential pressure valve—is arranged in this by-pass line 26 which is controlled in dependence on the pressure in the suction-pipe 14 or in the mixture manifold space 16 and by way of which the by-pass line cross section and therewith the injection pressure of the suction-pipe injection nozzle 13 is controlled with a view toward matching the injected fuel quantity to the supplied air quantity. The by-pass line 26 is closed off by the throttle valve 27 in the upper load range in which one operates with quality control.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An internal combustion engine operating with applied ignition and minimum fuel injection, which comprises ignition chamber means, main combustion space means having a variable volume, a respective ignition chamber means terminating in the corresponding main combustion space means, fuel circulation means including a fuel tank, a feed line, and a return line, an injection nozzle means coordinated to the ignition chamber means and disposed within the fuel circulation means, means for supplying to the fuel circulation means a fuel quantity exceeding a discharge quantity of the injection nozzle means coordinated to the ignition chamber means, throttle means in the return line of the fuel circulation means downstream of the injection nozzle means coordinated to the ignition chamber means, and a throttle valve means arranged in a suction pipe of the engine, characterized in that a main injection means is provided for supplying a main injection quantity of fuel to the main combustion space means, a line means is provided and communicates the main injection means with the return line such that the main injection quantity is supplied from the return line, and control means are provided for controlling an adjustment of the throttling means and throttle valve means in dependence on a load of the engine so as to control the main injection quantity as a function of the load.

2. An internal combustion engine according to claim 1, characterized in that the throttle means is a throttle valve.

3. An internal combustion engine according to claim 1, characterized in that an essentially constant fuel quantity is fed into the fuel circulation means, and in that the main injection means is injection nozzle means arranged in the suction pipe.

4. An internal combustion engine according to claim 1, characterized in that the return line throttle means is controllable in dependence on a position of a throttle valve arranged in the suction pipe.

5. An internal combustion engine according to claim 4, characterized in that the return line throttle means is controlled by a valve means.

6. An internal combustion engine according to claim 5, characterized in that the valve means is a fuel pressure control valve.

7. An internal combustion engine according to claim 5, characterized in that the return throttle means and the throttle valve are adjustable by way of a drive pedal.

8. An internal combustion engine with an actuating means for the throttle valve according to claim 7, characterized in that an automatically returning transmission means for yielding in an actuating direction corresponding to an opening direction of the throttle valve is arranged in an actuating means for the throttle valve.

9. An internal combustion engine according to claim 8, characterized in that a fully opened position of the throttle valve is reached prior to reaching a full-load position of the drive pedal.

10. An internal combustion engine according to claim 9, characterized in that an abutment means for defining the fully opened position of the throttle valve is coordinated to the throttle valve.

11. An internal combustion engine according to claim 10, characterized in that a by-pass line means for by-passing the main injection means and the valve means controlling the return line throttle means is coordinated to the return line, and a throttle element is arranged in said by-pass line means which is controlled in dependence on a pressure in the suction pipe.

12. An internal combustion engine according to claim 10, characterized in that an essentially constant fuel quantity is fed into the fuel circulation means, and in that the main injection means includes an injection nozzle arranged in the suction pipe.

13. An internal combustion engine according to claim 1, characterized in that the return throttle means and a throttle valve arranged in the suction pipe are adjustable by way of a drive pedal.

14. An internal combustion engine with an actuating means for the throttle valve according to claim 13, characterized in that an automatically returning transmission means yielding in an actuating direction corresponding to an opening direction of the throttle valve is arranged in an actuating means for the throttle valve.

15. An internal combustion engine according to claim 14, characterized in that a fully opened position of the throttle valve is reached prior to reaching a full-load position of the drive pedal associated with the engine.

16. An internal combustion engine according to claim 15, characterized in that an abutment means for defining the fully opened position of the throttle valve is coordinated to the throttle valve.

17. An internal combustion engine according to claim 1, characterized in that a by-pass line means for by-passing the line means communicating the main injection means with the return line and the return line throttle means is coordinated to the return line, and a throttle element is arranged in said by-pass line means which is controlled in dependence on a pressure in the suction pipe.

18. A multi-cylinder internal combustion engine according to claim 1, characterized in that said control means includes an elastic actuating means operatively connected with said throttle valve means, and cam means are provided for operatively connecting said actuating means and the throttle valve means with a load control member such that a displacement of the load control member results in an adjustment of the throttle means and the throttle valve means, said cam means are arranged with respect to said throttle means and said actuating means such that, upon a full opening of said throttle valve means by a displacement of the load control member, any further displacement of the load control member adjusts the throttle means so as to provide an increase in a fuel quantity supplied to the main injection means without a further adjustment of said throttle valve means.

19. A multi-cylinder internal combustion engine according to claim 18, characterized in that means are provided for effecting a fine control of an air-fuel ratio in the suction pipe in the low and partial load range operation of the engine.

20. A multi-cylinder internal combustion engine according to claim 1, characterized in that a means for effecting a fine control of an air-fuel ratio in the suction pipe is provided and includes a by-pass line means connected to the fuel return line means for by-passing the main fuel injection means and the throttle means, and in that a throttle element is arranged in said by-pass line means, said throttle element is controlled in dependence on a pressure in the air suction pipe.

* * * * *